(12) United States Patent
Batten et al.

(10) Patent No.: US 12,252,416 B2
(45) Date of Patent: Mar. 18, 2025

(54) CONTROL OF GREASE REMOVAL EQUIPMENT VIA CELL PHONE APP

(71) Applicant: Thermaco Incorporated, Asheboro, NC (US)

(72) Inventors: William C. Batten, Asheboro, NC (US); Randolph Batten, Asheboro, NC (US)

(73) Assignee: Thermaco Incorporated, Asheboro, NC (US)

( * ) Notice: Subject to any disclaimer, the term of this patent is extended or adjusted under 35 U.S.C. 154(b) by 563 days.

(21) Appl. No.: 17/500,788

(22) Filed: Oct. 13, 2021

(65) Prior Publication Data

US 2022/0112097 A1   Apr. 14, 2022

Related U.S. Application Data

(62) Division of application No. 15/754,536, filed as application No. PCT/US2016/048372 on Aug. 24, 2016, now Pat. No. 11,168,004.

(Continued)

(51) Int. Cl.
*C02F 1/00* (2023.01)
*B01D 17/02* (2006.01)
(Continued)

(52) U.S. Cl.
CPC .............. *C02F 1/008* (2013.01); *B01D 17/02* (2013.01); *B01D 17/0202* (2013.01);
(Continued)

(58) Field of Classification Search
CPC .... C02F 1/008; C02F 1/02; C02F 1/40; C02F 2209/006; C02F 2209/008; C02F 2209/02;
(Continued)

(56) References Cited

U.S. PATENT DOCUMENTS

| 4,972,709 A | 11/1990 | Bailey, Jr. et al. |
| 5,063,505 A | 11/1991 | Pate et al. |

(Continued)

FOREIGN PATENT DOCUMENTS

| CA | 2519778 | 10/2009 |
| CN | 202748633 | 2/2013 |

(Continued)

OTHER PUBLICATIONS

Sensor Smartserv Grease Brochure, Intelligent Grease Management, p. 1-4.

(Continued)

*Primary Examiner* — Waqaas Ali
(74) *Attorney, Agent, or Firm* — MacCord Mason PLLC

(57) ABSTRACT

A separator assembly for separating fat, oil, and grease from effluent includes a container for receiving and holding effluent water containing oil, grease and solid waste to be removed from the effluent water and a communications module having a processor, memory and transmitter at the facility site to communicate over cellular or WiFi signals with a remote station. The separator may include a skimmer to skim F.O.G. from the effluent water held in the container or be of a grease trap mode collecting F.O.G. for subsequent removal.

15 Claims, 11 Drawing Sheets

Related U.S. Application Data

(60) Provisional application No. 62/210,094, filed on Aug. 26, 2015.

(51) Int. Cl.
*B01D 17/12* (2006.01)
*C02F 1/02* (2023.01)
*C02F 1/40* (2023.01)
*E03F 5/16* (2006.01)
*G05B 21/02* (2006.01)
*H04Q 9/00* (2006.01)

(52) U.S. Cl.
CPC ......... *B01D 17/0214* (2013.01); *B01D 17/12* (2013.01); *C02F 1/02* (2013.01); *C02F 1/40* (2013.01); *E03F 5/16* (2013.01); *G05B 21/02* (2013.01); *H04Q 9/00* (2013.01); *C02F 2209/006* (2013.01); *C02F 2209/008* (2013.01); *C02F 2209/02* (2013.01); *C02F 2209/42* (2013.01); *H04Q 2209/40* (2013.01); *H04Q 2209/823* (2013.01)

(58) Field of Classification Search
CPC . C02F 2209/42; B01D 17/02; B01D 17/0202; B01D 17/0214; B01D 17/12; E03F 5/16; G05B 21/02; H04Q 9/00; H04Q 2209/40; H04Q 2209/823
See application file for complete search history.

(56) References Cited

U.S. PATENT DOCUMENTS

| | | | |
|---|---|---|---|
| 5,705,055 A | 1/1998 | Holloway, Jr. et al. | |
| 5,946,967 A | 9/1999 | Russell | |
| 6,251,286 B1 | 6/2001 | Gore | |
| 6,261,446 B1 | 7/2001 | Cornick | |
| 6,423,213 B1 | 7/2002 | Mazurek | |
| 6,619,118 B1 | 9/2003 | Keck | |
| 6,879,935 B2 | 4/2005 | Keck | |
| 7,854,051 B2 | 12/2010 | Batten et al. | |
| 8,943,911 B1 | 2/2015 | Terrell et al. | |
| 9,095,162 B2 | 8/2015 | Xia | |
| 9,139,457 B2 | 9/2015 | Hatten | |
| 2002/0109592 A1 | 8/2002 | Capano et al. | |
| 2005/0029201 A1 | 2/2005 | Rodis | |
| 2009/0139325 A1 | 6/2009 | Cunningham et al. | |
| 2009/0159355 A1* | 6/2009 | Garwood | A23L 5/20 180/165 |
| 2009/0320265 A1* | 12/2009 | Batten | B01D 17/0202 29/428 |
| 2011/0068060 A1 | 3/2011 | Hatten | |
| 2011/0232381 A1 | 9/2011 | Al-Absi et al. | |
| 2011/0297626 A1* | 12/2011 | Batten | B01D 17/0211 210/519 |
| 2014/0340197 A1 | 11/2014 | Flood | |
| 2015/0118373 A1 | 4/2015 | Xia | |
| 2015/0293032 A1 | 10/2015 | Babichenko | |

FOREIGN PATENT DOCUMENTS

| | | |
|---|---|---|
| SE | 1230114 A1 | 5/2014 |
| SE | 537416 C2 | 4/2015 |

OTHER PUBLICATIONS

VL53L1 a FlightSense™ product ST life. Augmented 2017 STMicroelectronics p. 1-3.
VL53L0X World Smallest Time-of-Flight ranging and gesture detection senor ST life.augmented 2016 STMicroelectronics, p. 1-40.
Written Opinion in WO 2017/035220.

* cited by examiner

CONTROL OF GREASE REMOVAL EQUIPMENT VIA CELL PHONE APP

This application claims the benefit of U.S. provisional application No. 62/210,094 filed Aug. 26, 2015 which is herein incorporated by reference in its entirety.

FIELD

The present disclosure relates generally to grease removal assemblies, and more particularly to grease removal devices and methods having improved grease removal equipment controls.

BACKGROUND

Oil, grease and solid waste contaminant removal or recovery systems are well known in the prior art. Over the past thirty years there has been a steady move towards requiring food handling facilities to have systems for servicing kitchen grease and solid waste bearing water flows. Sewer system lines can become clogged from the fats, oil and grease waste materials (hereinafter referred to as "F.O.G.") put into the sewer system from food handling facilities. This has led more and more sewer authorities to implement fats, oils and grease control programs. These programs regulate food handling facilities and the manner in which they process F.O.G.s. The object of many of these programs is to ensure that food handling facilities remove as much of the F.O.G. as possible from the effluent flow, thereby releasing only grey water to the sewer system.

Active separators remove F.O.G. from the effluent, typically by some skimming operation. This skimming operation is generally accomplished through use of a container including one or more rotating disks formed of a plastic or like applicable material to which oil and grease contaminants are attracted. Typically, the rotation of the disk is in an at least partially immersed condition, which allows the oil to cling to one or both sides of the disk so that F.O.G. contaminants are removed from the body of water upon rotation of the disk. Scrapers are typically used to force the oil contaminants from the opposite sides of the disk and channel such contaminants to a collection or disposal storage unit. Examples of these separators are the BigDipper separators sold by Themiaco, Inc., of Asheboro, NC, and generally disclosed in U.S. Pat. No. 5,133,881 to Miller et al. entitled Oil & Grease Removal Apparatus; U.S. Pat. No. 6,213,002 to Batten et al. entitled Cooking Apparatus With Grease Removal System; U.S. Pat. No. 6,491,830 to Batten et al. entitled Improved Kitchen Grease Removal System; U.S. Pat. No. 6,800,195 to Batten et al. entitled Low Cost Grease Removal System; and U.S. Pat. No. 7,208,080 to Batten et al. entitled Low Cost Oil/Grease Separator. Another suitable F.O.G. separator is sold by Thermaco, Inc. of Asheboro, NC as Might Trap.

Skimming when skimming is required and not skimming when it is not required is an issue that has not yet been precisely addressed by the art. The traditional methodology is simply to use a timer that turns on the skimming apparatus at a certain standard time of day, at the same time each day, providing the user with control as to the time of day, regardless of skimming facility needs. For installations that have very regular schedules, this may be sufficient. However, most installations operate on irregular schedules and problems can arise. Schedule variations can be as simple as the differences between weekday and weekend operation. Also, for installations such as school cafeterias that do not operate during the summer, F.O.G. will not be added to the effluent during the summer, so there is not a reason to run the separator during the summer. Nonetheless, if the separator works on a regular set schedule according to its timer, it will run even if there is no F.O.G. to be removed.

One of the downsides of this operation, besides the wasted energy of skimmer operation, is that when all of the F.O.G. is removed, the water becomes exposed. There may be food solids remaining in the water that are decomposing and off-gassing foul odors. While the purpose of a F.O.G. removal system is to remove F.O.G. from the effluent, if a slight F.O.G. mat is allowed to remain on the water, the odor is more contained within the water. Therefore, removing as much F.O.G. as possible may not be the most desirable in some instances. Installations commonly discharge gray water taken from a low point of the container, so allowing a thin F.O.G. mat to remain on the surface well above that point does not usually result in the FO.G. discharging with the gray water.

Another form of F.O.G. separator is a grease trap. Grease traps have conventionally been made of concrete and buried in the ground to allow F.O.G.-laden effluent to enter, have the F.O.G. accumulate in the grease trap, and allow the F.O.G.-depleted grey water pass downstream. Periodically, the accumulated F.O.G. (and solids, in most cases) need to be removed by pumping with an above-ground truck. Knowing when to dispatch a pumper truck has heretofore been more art than science. Newer improvements on this mode of operation include the Trapzilla line of grease interceptors sold by Thermaco, Inc. of Asheboro, NC, discussed in U.S. Pat. No. 7,367,459 to Batten et al. entitled Passive Grease Trap Using Separator Technology and U.S. Pat. No. 7,641,805 to Batten et al. entitled Passive Grease Trap With Pre-Stage For Solids Separation. The disclosures of these patents are hereby incorporated herein by reference in their entireties.

It is known to locate thermocouples or other temperature sensors in the separator to detertmine temperature information and to determine the amount of F.O.G. stored in the separator container, as taught in U.S. Pat. No. 7,828,960 to Batten et al, entitled F.O.G. Separator Control, the entire disclosure of which is incorporated herein by reference. However, challenges still exist in controlling F.O.G. removal and Applicant believes in many circumstances F.O.G. removal equipment and controls may be improved.

There is a need in the art for an improved control for a F.O.G. removal assembly for the removal and recovery of F.O.G. and/or solid wastes found in drains or effluent discharge of restaurants, food processing, or like facilities, industrial plants, maintenance facilities, or other circumstances involving mixtures of oil, grease and solid waste material to be recovered or removed.

SUMMARY

An embodiment of the invention of the present disclosure addresses one or more of these needs in the art by providing a separator assembly for separating fat, oil, and grease from effluent including a container for receiving and holding effluent water containing oil, grease and solid waste to be removed from the effluent water; a skimmer to skim F.O.G. from the effluent water held in the container; sensors to generate signals about the separator's condition, and a communications module having a processor, memory and transmitter at the facility site to communicate the separator's condition over cellular or WiFi signals with a remote station. The sensors may include first and second thermocouples located at differing levels in the tank, and conductors may couple the thermocouples to a control box. The control box reads differing voltages in the thermocouples to determine if the thermocouples are surrounded by F.O.G. or water.

Typically, the tank has a top and the thermocouples are mounted on rods that extend down from the top. The thermocouples may be mounted at lower ends of their respective rods, with the first rod being longer than the second rod. In some embodiments, the tank has a defined capacity for holding F.O.G. and a first rod positions a thermocouple at a level where the tank is considered to be about 75% of the defined capacity, and a second rod positions a thermocouple at a level where the tank is considered to be about 50% of the defined capacity.

In one embodiment the thermocouples may have conductors extending to a connector, whereby an output box may be selectively connected to the connector for periodic sensing to determine if the thermocouples are surrounded by F.O.G. or water. The output box can be considered a part of the novel combination, and if so, the output box is typically configured to periodically input a current to heating elements at the thermocouples and a volt meter in the box connected to the thermocouples measures the output voltages of the thermocouples.

In another embodiment, the separator has a skimmer and a control system that acts on the sensed voltages determining when to skim. If the separator has a skimmer, the control system may actuate the skimmer when the thermocouple on the first rod is surrounded by F.O.G. In a separator that has a skimmer, the system may be used with only one thermocouple and a timer. The thermocouple's sensing of F.O.G. can indicate when skimming is to commence, and the time can be used to terminate skimming after a predefined interval.

The communications module is preferably in communication with a GPS module to allow determination of the geographic location of the separator assembly.

The container may include a heating element electrically connected to the communications module to heat effluent in the container when heating commands are received from the remote station.

In another embodiment the invention provides a separator assembly for separating fat, oil, and grease from effluent including a container for receiving and holding effluent water containing oil, grease and solid waste to be removed from the effluent water, whereby F.O.G. collects in the container as grey water is passed downstream from the container; a sensor to sense and signal when a threshold amount of F.O.G. has collected in the container, and a communications module operatively connected to the sensor having a processor, memory and transmitter at the facility site to communicate over cellular or WiFi signals with a remote station to indicate that the separator assembly should have collected F.O.G. removed from it.

The above summary was intended to summarize certain embodiments of the present disclosure. Embodiments will be set forth in more detail in the figures and description of embodiments below. It will be apparent, however, that the description of embodiments is not intended to limit the inventions of the disclosure, the scope of which should be properly determined by the appended claims.

BRIEF DESCRIPTION OF THE DRAWINGS

The invention will be better understood by a reading of the Detailed Description of Embodiments along with a review of the drawings, in which.

DESCRIPTION OF EMBODIMENTS

Figure 1:
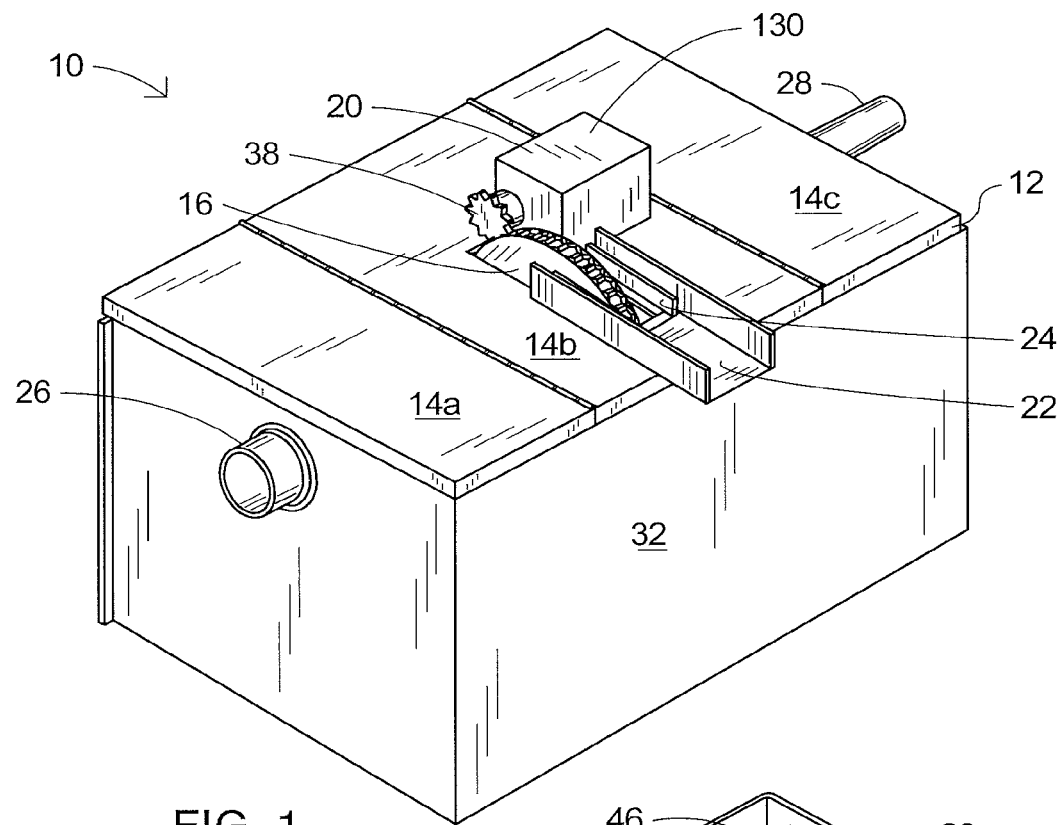
FIG. 1 is a perspective view of one example of a separator assembly according to the present disclosure.

In the following description, like reference characters designate like or corresponding parts throughout the several figures. It should be understood that the illustrations are for the purpose of describing preferred embodiments of the invention and are not intended to limit the invention thereto. Also in the following description, it is to be understood that such terms as "forward," "rearward," "left," "right," "upwardly," "downwardly," and the like are words of convenience and are not to be construed as limiting terms.

In one example, as best seen in FIGS. 1-9, a F.O.G. separator assembly 10 includes a container 12. The container 12 may include sectional covers 14a, 14b, and 14c. In one example, as in FIG. 1, the sectional covers are joined by hinges. The cover can be made up of sectional units or a single-unit cover. The sectional covers 14a, 14b and 14c cover each of the sections of the F.O.G. and/or solid waste removal assembly and may be one piece, attached or separate. The assembly 10 has at least one skimmer assembly. In one example, the skimmer assembly includes a rotatable disk 16 which may be supported, as shown, by the center sectional cover 14b. FIG. 1 shows a gear drive motor 20 and a trough 22 which may be attached to the cover 14b. The container 12 also includes an inlet pipe 26 and an outlet pipe 28. The effluent water, with waste materials, enters through the inlet pipe 26, and after oil, grease and solid waste have been removed, the grey water exits out of the outlet pipe 28. The trough 22 may include scraper blades 24. In this example, the gear drive motor 20 typically supports and rotates a drive sprocket 38 which is cooperatively meshed with peripheral holes in the disk 16.

Figure 2:
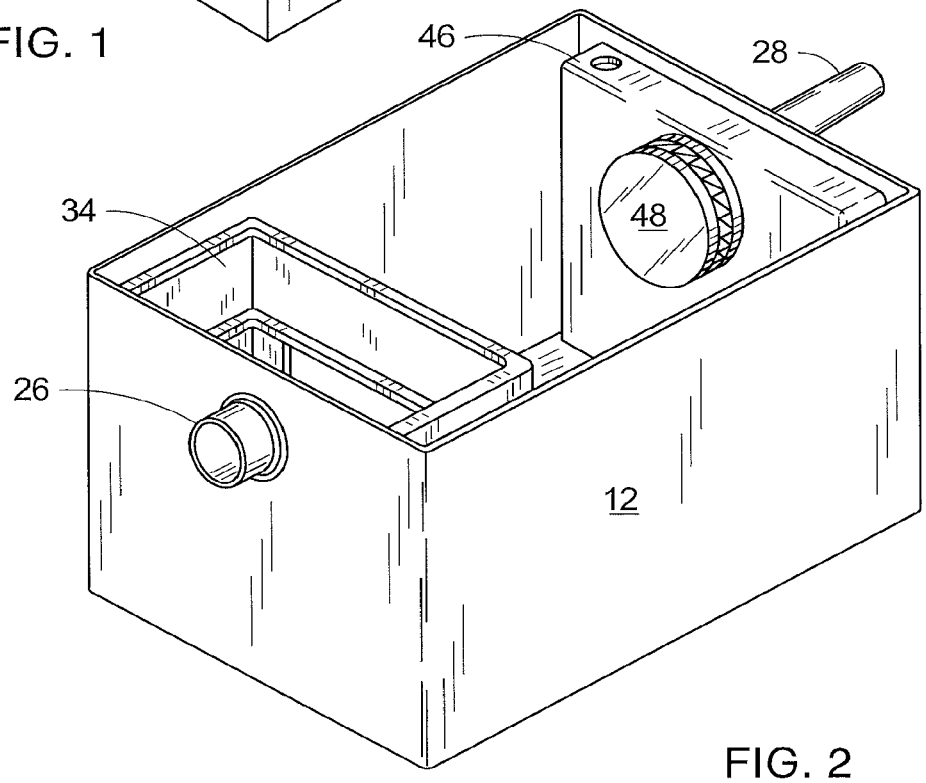
FIG. 2 is a perspective view of one example of a container with a basket support and an outlet baffle installed.
Figures 3, 4:
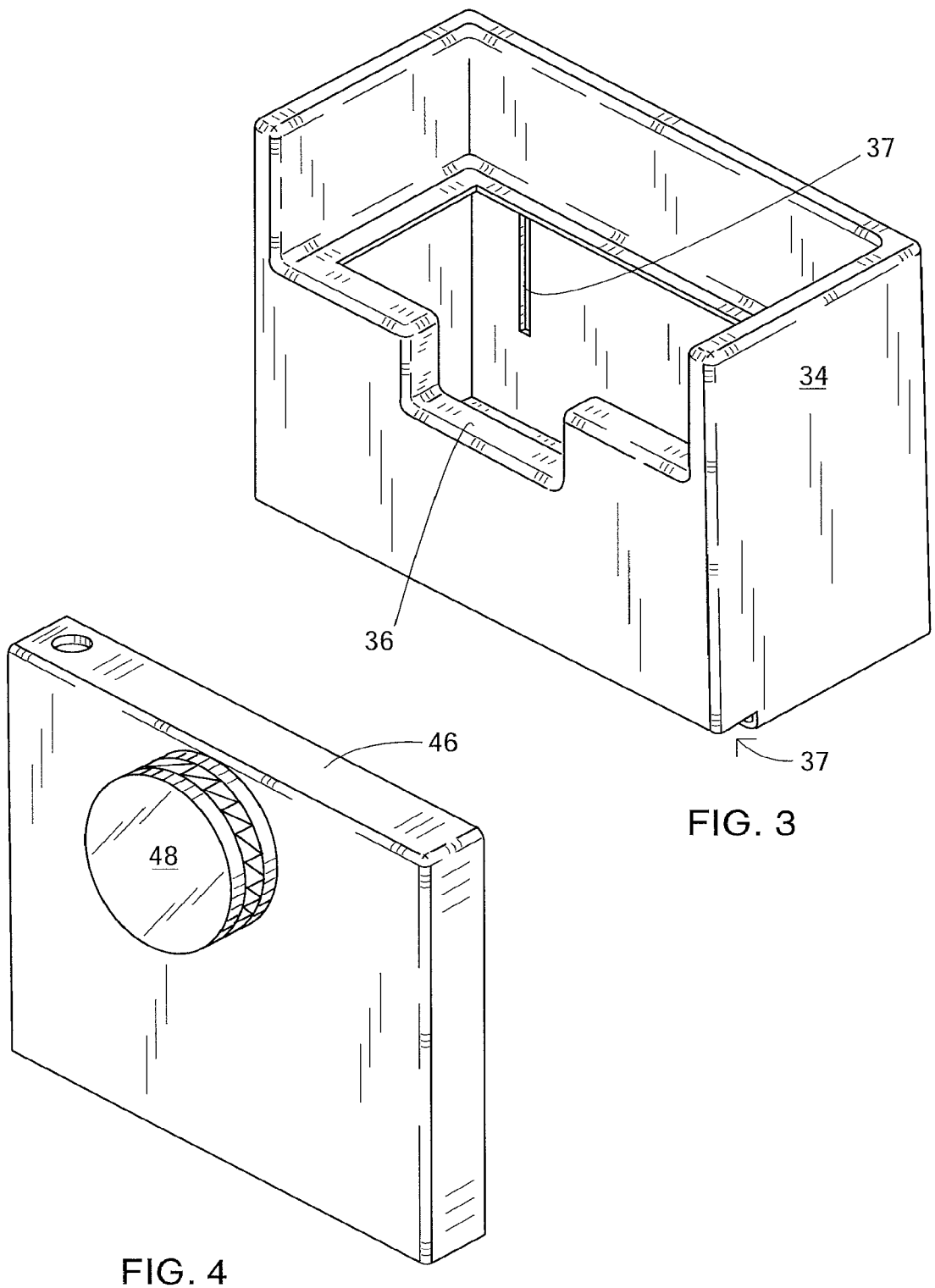
FIG. 3 is a perspective view of one example of a basket support.
FIG. 4 is a perspective view of one example of an outlet baffle.
Figure 5:
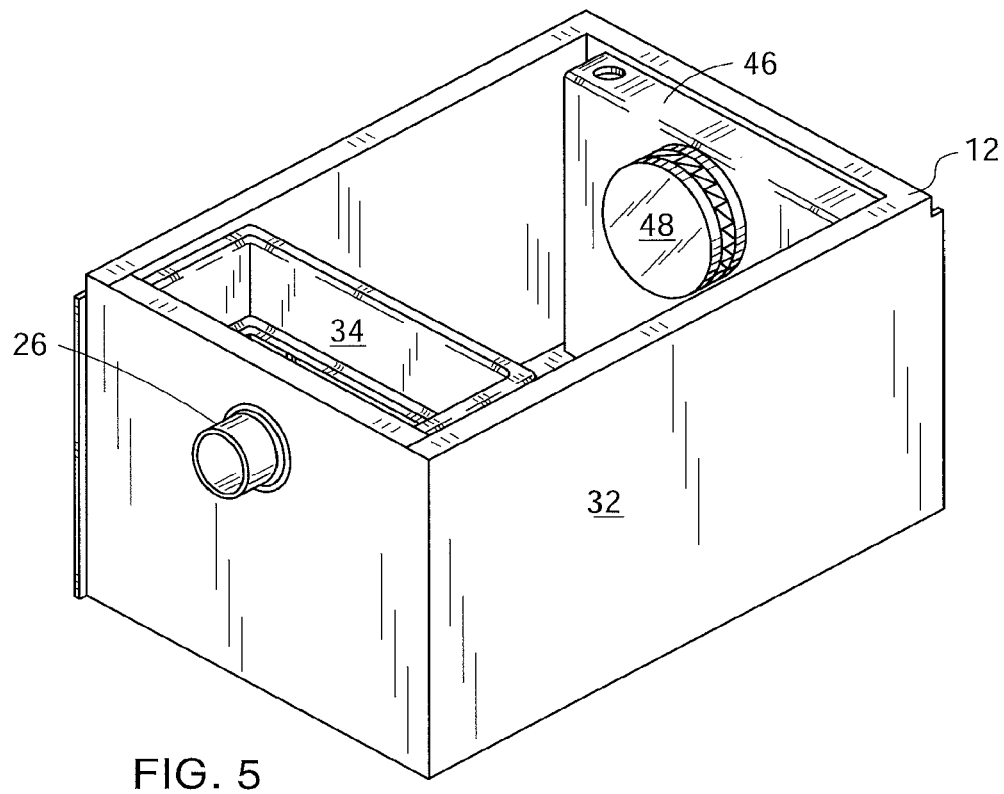
FIG. 5 is a perspective view of one example of a container and a wrap.
Figure 6:
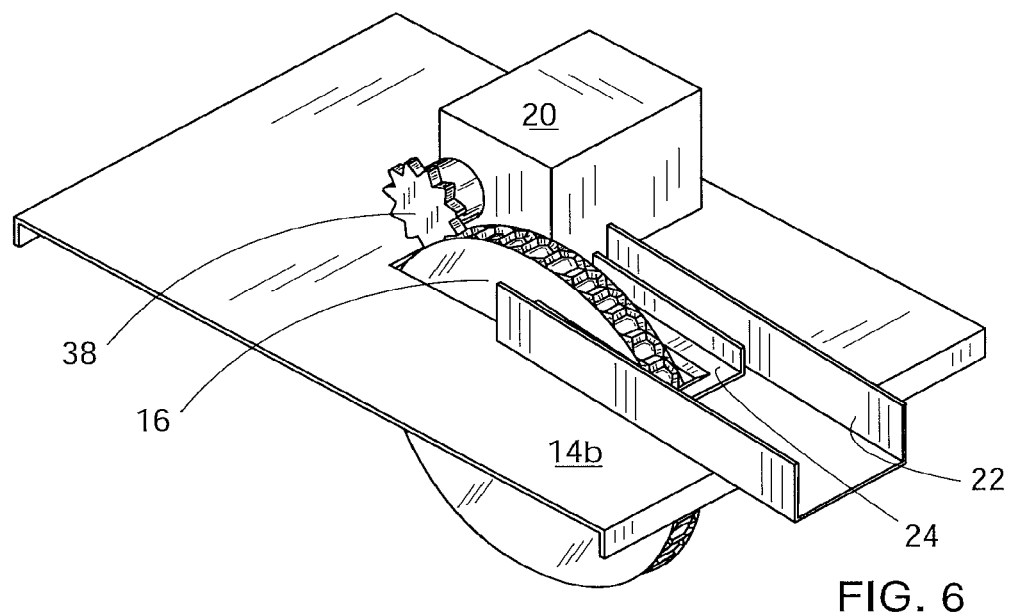
FIG. 6 is a perspective view of one example of a cover with a gear drive motor, a disk, and a trough.
Figure 6A:
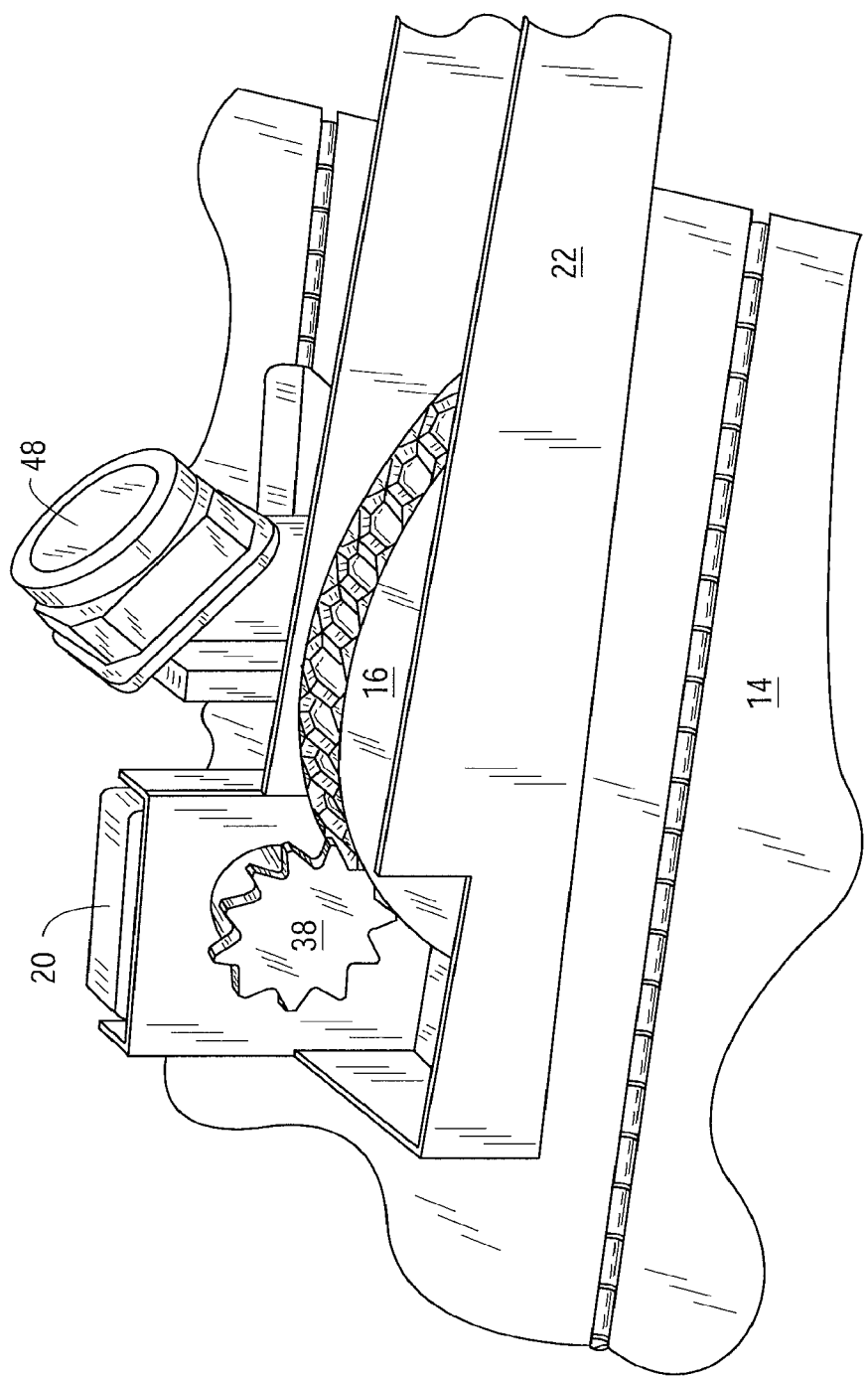
FIG. 6A is a perspective side view of one example of a cover with a gear drive motor, a disk, a trough and a timer.
Figure 8:
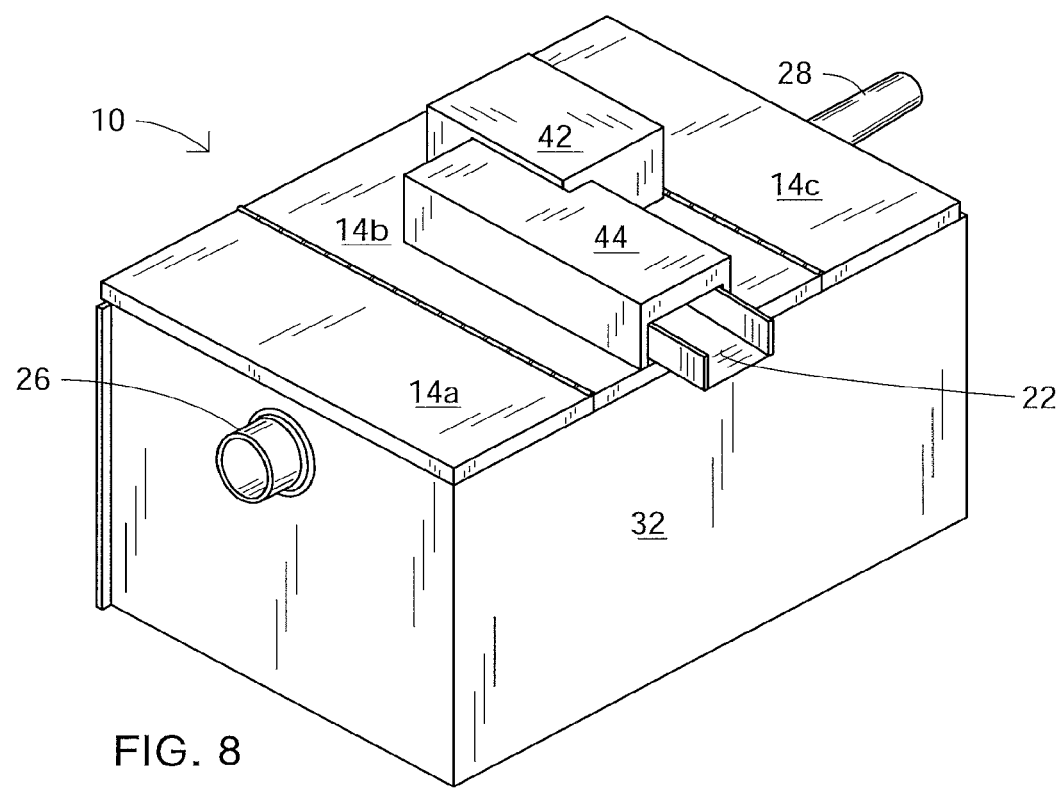
FIG. 8 is perspective view of one example of an oil, grease and solid removal assembly including a cover.

Container 12 may be constructed of rotomolded plastic and may include a basket support 34 as shown in FIGS. 2 and 3. The basket support 34 is typically constructed of rotomolded plastic and may be designed to hold a strainer basket (not shown). The basket support 34 may be immediately downstream of the inlet pipe 26 and has a cutout 36 to align with the inlet pipe 26. Basket support openings 37 permits the effluent water with fat, oil and grease to flow downstream of the basket support 34 after the solid waste material has been trapped in the strainer basket removably positioned in the support 34.

Figure 7:
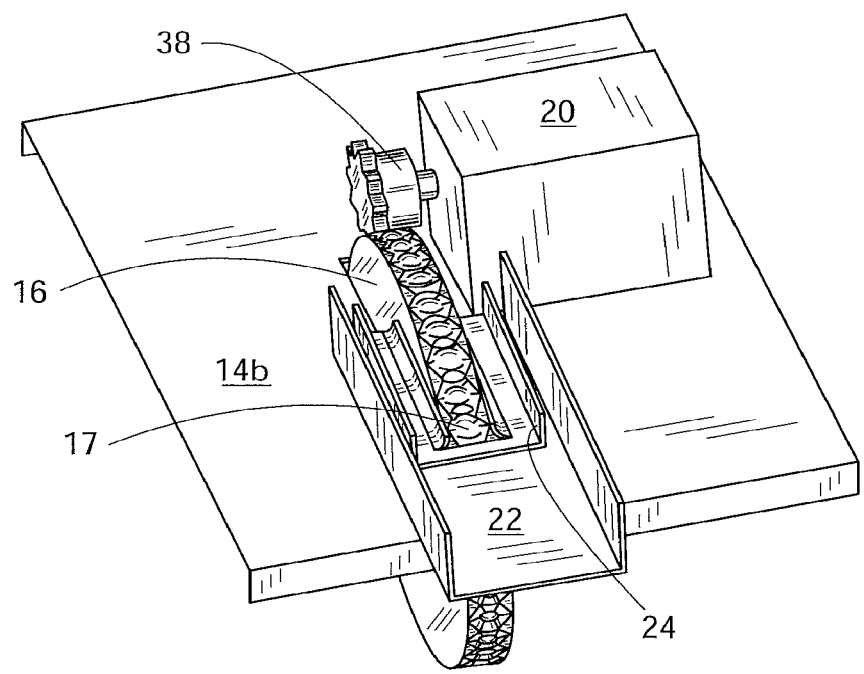
FIG. 7 is a top perspective view of one example of a cover with a gear drive motor, a disk, and a trough.
Figure 7A:
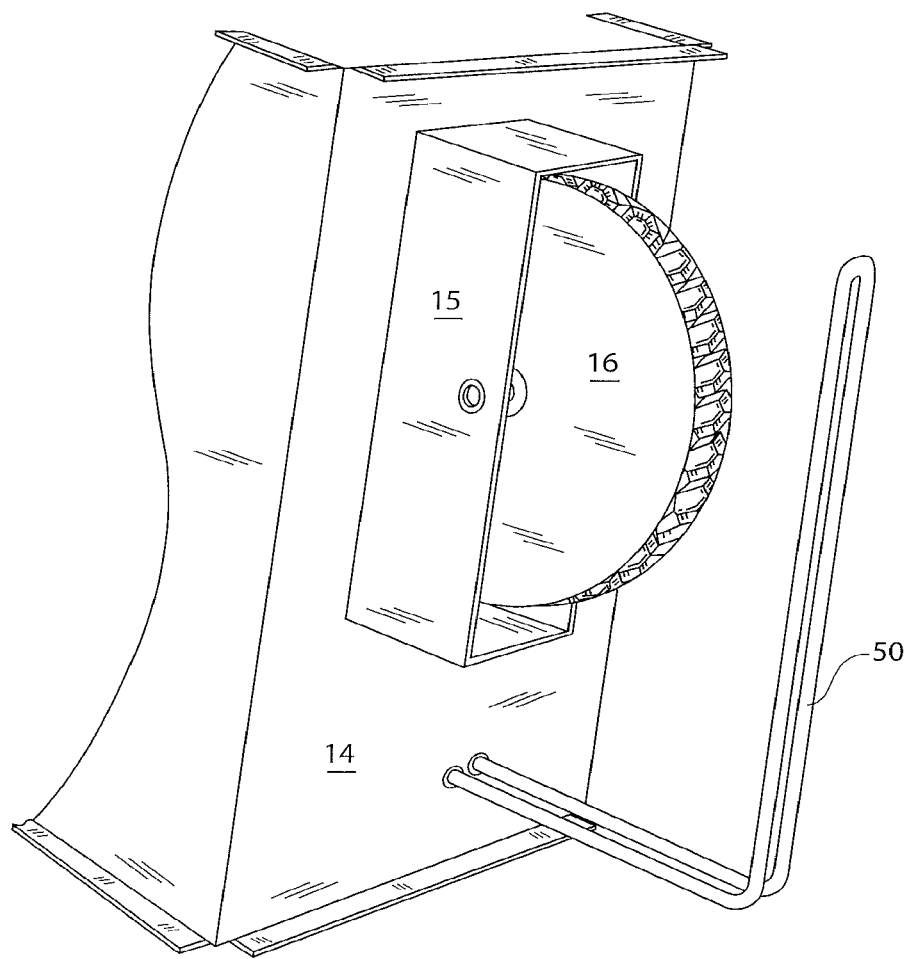
FIG. 7A is a bottom perspective view of one example of a cover with a disk and a heating element.

As seen in FIG. 7A, the cover 14b may also support a heating element 50 that extends down into the water held in the container 12 and which is used to maintain a sufficiently warm enough water temperature to melt any grease contained in the grey water, permitting it to flow to and be removed by the rotating disk 16. The heating element 50 is, by way of example, a 450 watt heater.

An oil/grease storage tank (not pictured) may be in communication with the trough 22 in order to receive the F.O.G. which has been scraped from the disk 16 by the scraper blades.

In operation, the fat, oil, grease and/or solid removal assembly 10 is connected to drain from a sink or other device that discharges effluent water with waste materials to be separated. The water containing waste materials flows from the device's drain into the F.O.G. and/or solid removal assembly 10 through the inlet pipe 26. The effluent water flows into the basket support 34 containing a strainer basket and the solid waste materials are trapped and removed from the effluent water. The effluent water containing fat, oil and grease flows downstream from the basket support 34 through openings into the center section of container 12. In the volume of the container 12 between the basket support 34 and an outlet baffle, the effluent has time to reside, permitting fats, oil and grease to rise to the top of the water. The grease is maintained in a liquid state by the heater 50. The heating element also turns on when the thermistor detects a temperature approaching freezing (i.e. 0 degrees Celsius).

When the gear drive motor 20 turns the drive sprocket 38, the disk 16 is rotated in a clockwise direction by the counter clockwise rotation of the drive sprocket 38. The disk 16 is positioned in the center cover 14b, so that its lower portion is below the surface of the effluent water having the fat, oil and grease which has floated to the surface. As the disk 16 rotates through the water, F.O.G. is picked up on the sides of the disk 16 and the scraper blades 24 attached to the trough 22 remove the F.O.G. from the sides of the disk 16. The F.O.G. flows down the trough 22 to a F.O.G. storage container. Once the F.O.G. have been removed from the effluent water, the grey water flows downstream under the baffle outlet and exits the F.O.G. removal assembly 10 through the outlet pipe 28 into the sewage system. More examples and details of a F.O.G. removal assembly may be found in U.S. Pat. No. 6,800,195 to Batten et al. and U.S. Pat. No. 7,208,080 to Batten et al. which are both herein incorporated by reference in their entireties. Other types of skimmers can be used in the invention, too, including but not limited to: belt skimmers, examples of which can be seen in U.S. Pat. No. 7,427,356 to Chapin and U.S. Pat. No. 7,296,694 to Weymouth; skimmers that include one or more rotating cylinders that partially or completely submerge, one example as is shown in U.S. Pat. No. 4,051,024 to Lowe et al; skimmers with an absorptive affinity for F.O.G and/or skimmers that include non-cylindrical grease collectors pivoting to come into contact with F.O.G. for removal, one example as seen in U.S. Pat. No. 4,235,726 to Shimko. Another suitable F.O.G. separator is sold by Thermaco, Inc. of Asheboro, NC as its Might Trap brand product.

Figure 9:
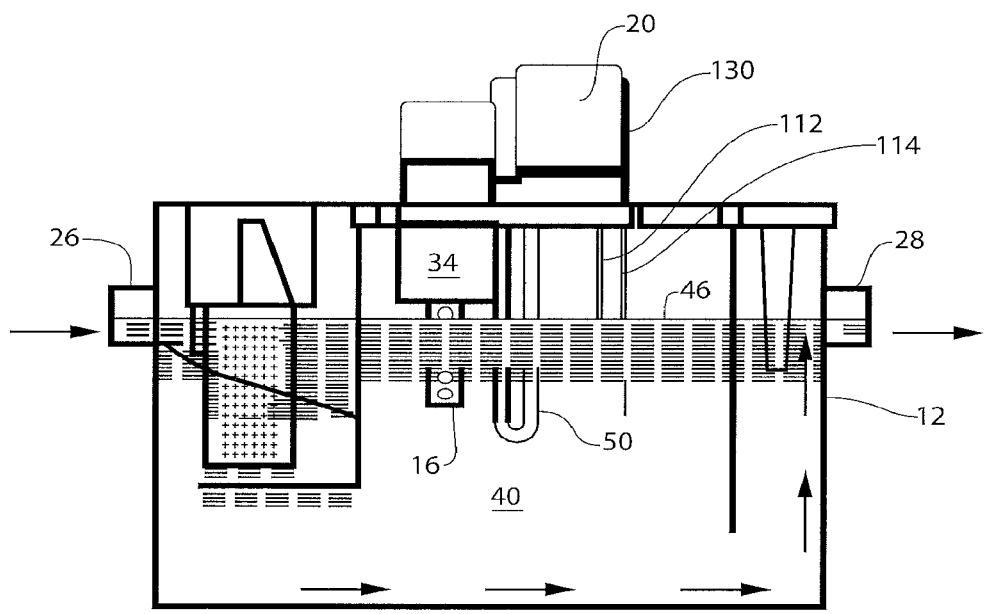
FIG. 9 is a schematic view of an active F.O.G. separator equipped with an embodiment of the invention.

As seen in FIG. 9 the preferred embodiment provides a F.O.G. separator (that may have a control system) that senses a F.O.G. layer using thermocouples. Two rods that are suspended from the ceiling. As used in this application, "skimming" includes other ways of taking the F.O.G. off the top, including opening spouts that drain the F.O.G. (see U.S. Pat. No. 7,186,346 for examples), pumping the F.O.G. (see U.S. Pat. No. 6,517,715 for an example), or other active methods.

In one example, rods 112, 114 are of differing length, and each has at its end a thermocouple and heater. Each thermocouple and heater has wires that travel inside the respective rods to a control box with communications module 130 in the embodiment of FIG. 9 in the roof of the unit. The control box 130 is configured to periodically input current to the heating element. A volt meter may be included in the box 130 on the output lines of the thermocouple to measure the output voltage of the thermocouple. Alternatively, the box 130 can digitize and communicate the reading from the thermocouple for evaluation at a remote server, as will be discussed below.

The thermocouple output voltage varies with its temperature, and its temperature response to the applied voltage varies with the dissipation of heat from the heater into the surrounding liquid. If the liquid is water, the heat dissipation from the heater is at a faster rate than if the heater is located in F.O.G. so if the thermocouple is in F.O.G. its temperature will rise faster than if it is in water. If the heater is in air, the temperature rise is much faster yet. Thus, the temperature rise of the thermocouple and, hence its output voltage, will vary depending on whether the thermocouple is immersed in air, water or F.O.G. This difference is sufficient to enable control or output box 18 to identify whether one or more of the thermocouple probes is located in air, F.O.G. or water.

The thermocouples are useful on the active F.O.G. removal units, such as the Big Dipper. As seen in FIG. 9, such active units include a container 12 that receives effluent from an inlet 26 and allows the flow rate to slow sufficiently that a F.O.G. mat 38 can collect on top of the grey water 40.

Numerous advantages can result when the active separator is used with sensors that measure when a sufficient F.O.G. mat 38 is present in the container 12 to warrant operation of the active separator, and that avoid or terminate operation when not needed. The sensed data can be communicated to a remote server for decision-making, and decisions can be downloaded to the separator, using the communications module, as discussed in more detail below.

This type of control of the operation avoids wasted operation and it avoids operation for periods when operation is not needed. In some instances, a particularly heavy load of F.O.G. needs removal, and if the skimmer operates for a pre-set removal period, inadequate removal may be the result.

Also, by halting the removal of F.O.G. early enough, so as to always leave a slight layer of F.O.G. on the top of the water, the escape of foul odors from the water that would be exposed by complete removal of the F.O.G. can be avoided. As seen in FIG. 9, detector 112 is slightly below the static water line 46. By terminating operation as soon as the detector 112 senses water, rather than F.O.G., a slight F.O.G. mat remains above the grey water 40. This also avoids the release of humidity that can challenge the longevity of electronics and other gear of the separator.

A logic circuit can be provided to indicate a malfunction has occurred requiring service if the lower most sensor 114 continues to detect F.O.G. after separator operation for enough time that F.O.G. removal should be complete.

The logic of determining whether a sensor is in F.O.G., water, or air is explained in more detail in U.S. Pat. No. 7,828,960 to Batten et al., the entire disclosure of which is incorporated herein by reference.

When a sufficiently thick level of F.O.G. is determined to exist, the heater 49 which is immersed in the water (as is conventional) can be actuated to raise the temperature of the liquids so as to assure that the F.O.G. will be in a liquefied form. This can be followed by operation of the active skimmer 32, which continues until such time as the upper level thermocouple 112 begins output data that it is immersed in water, rather than F.O.G., at which time the active skimmer is stopped. The signals to operate the skimmer can be comparable to those conventionally received from a timer for timer-operated skimmers.

If the rate of rise of temperature for either thermocouple is extraordinarily fast, logic can sense that the thermocouple is in air, rather than in F.O.G. or water. Suitable logic can be provided to deal with that circumstance. In particular, for a F.O.G. removal separator that is provided with an automatic solids transfer unit (such as is shown in U.S. Pat. Nos. 6,491,830 or 5,360,555) the fact that the sensor is in air indicates that the automatic solids transfer unit should not operate.

The provision of the sensors enables the elimination of the conventional electromechanical timer as the control of when to turn on the skimmer. If desired, a timer can be used to determine when to send sensing voltage to the probes. Also, in some instances the collection canister for removed F.O.G. is of a limited capacity, so that allowing F.O.G. to be directed to the canister from the skimmer for an unspecified period of time risks overflowing the canister. In such cases it may be preferable to use a timer to terminate skimming after a predefined time interval, although skimming starts when a thermocouple senses F.O.G. In such installations, only the one thermocouple is needed.

Figure 10:
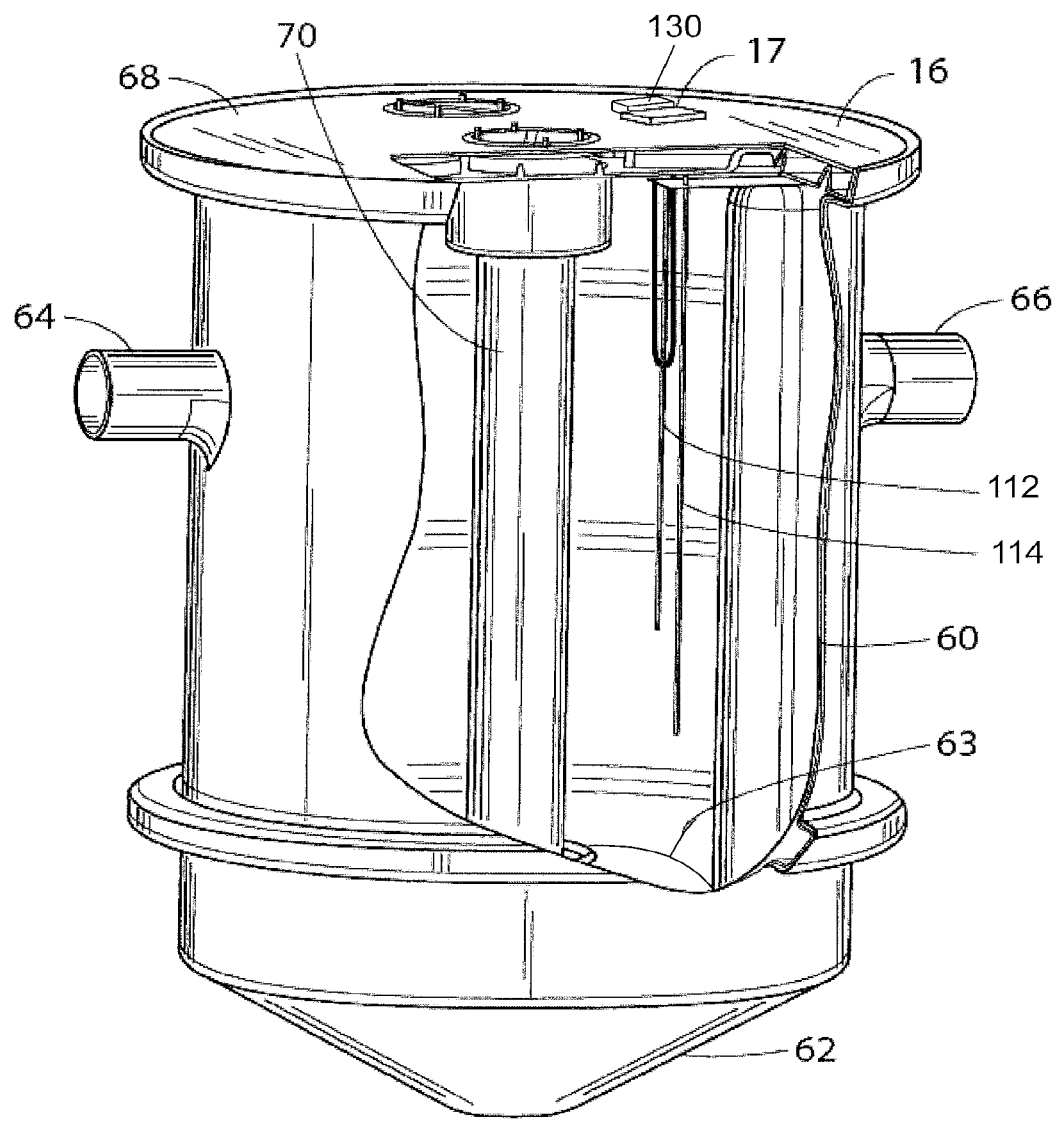
FIG. 10 is a schematic view of a passive separator equipped with an embodiment of the invention.
Figure 11:
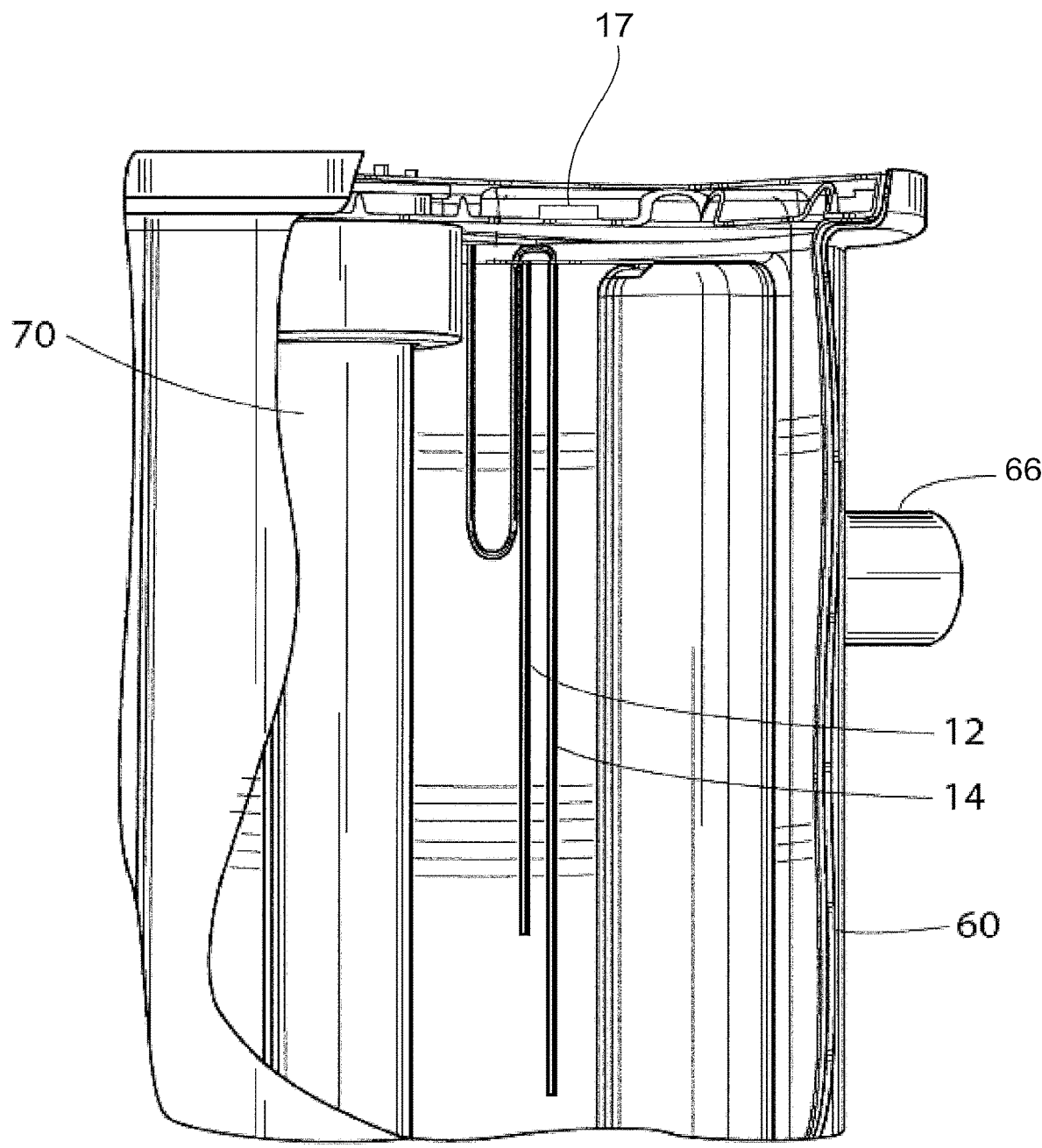
FIG. 11 is a schematic view of the embodiment of FIG. 10.
Figure 12:
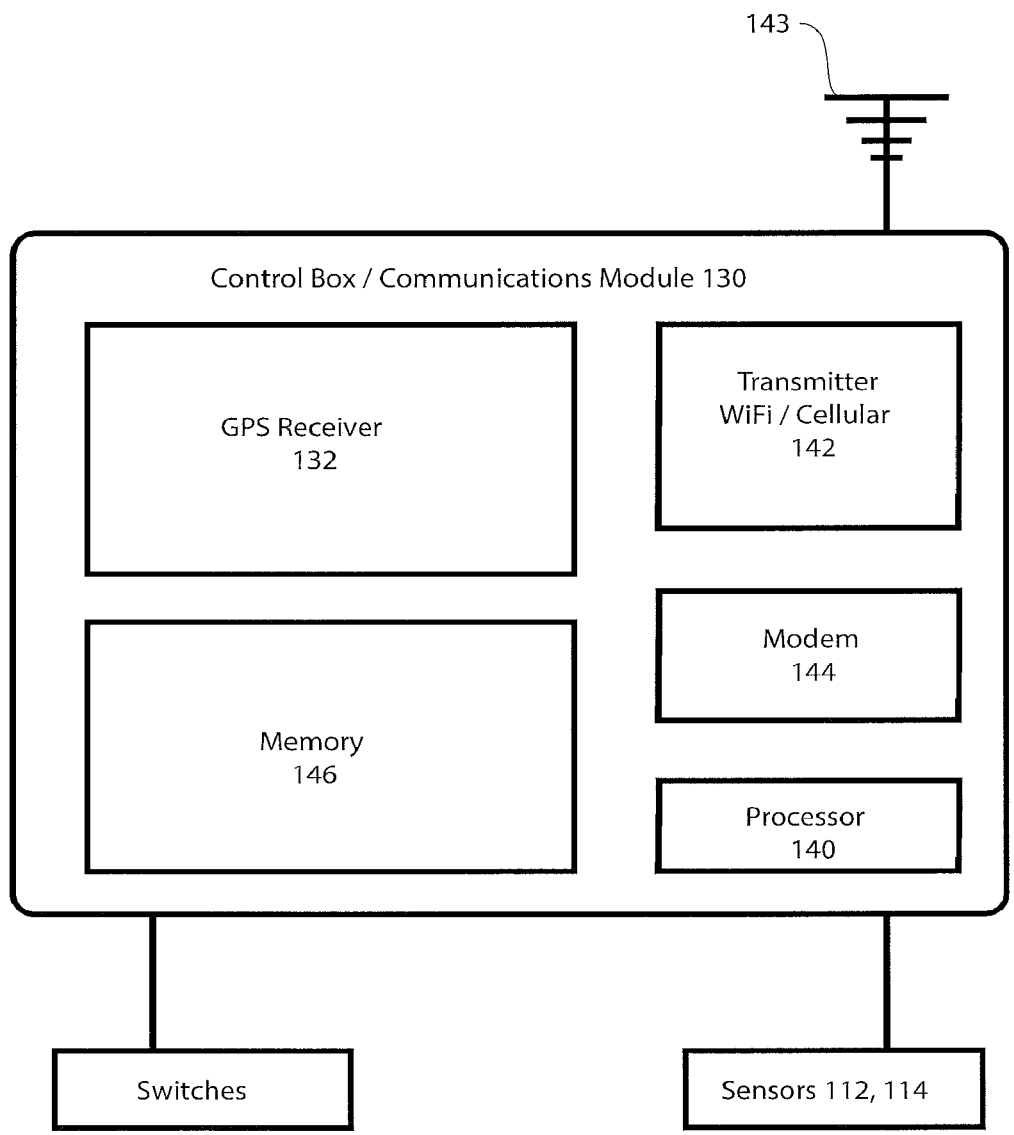
FIG. 12 is a block diagram of a F.O.G. separator including a communications module and GPS.

Additional F.O.G. removal devices with which the invention can be used include the Trapzilla line of grease interceptors sold by Thermaco, Inc. of Asheboro, NC, discussed in U.S. Pat. No. 7,367,459 to Batten et al. entitled Passive Grease Trap Using Separator Technology and U.S. Pat. No. 7,641,805 to Batten et al. entitled Passive Grease Trap With Pre-Stage For Solids Separation. The disclosures of these patents are hereby incorporated herein by reference in their entireties. It can also be used on other F.O.G. separators that have electrical components. U.S. Pat. No. 7,367,459 describes a F.O.G. trap for separating F.O.G. and solid waste from waste water. An example is seen in FIGS. 10 and 11 of this application. The F.O.G. trap includes a tank 60, in this example, having a conically shaped bottom 62. A divider 63 divides the tank into an upper chamber and a lower chamber. A hole (not shown in the FIG. 10 or 11) near an upper part of the divider 63 allows F.O.G. to rise into the upper chamber. An inlet invert 64 in the tank receives incoming waste water, while an outlet invert 66 removes water from the tank. A lid 68 covers the tank. A pipe 70 extends through the lid, upper chamber, and the divider for pumping solid waste out of the lower chamber, as well as the F.O.G.s, most grey water having passed through the outlet invert 66.

Two vertical rods 112 and 114 supported by lid 68 have the heater/thermocouple assemblies in their lower portion, by way of example the lower 1 to 2 inches. The remainder of the column lengths of the rods is made up of conduit for carrying the wires to the top and for supporting the heater/thermocouple at the correct depth within the tank. The longer rod 14 preferably terminates at the level where the tank is considered to be about 75% full of F.O.G., and the shorter one is at about the 50% level. Other locations can be used. The power and thermocouple wires come from the top of the rods and connect through connector 17 to control box 130 and to allow for periodic connection through connector 17 to an "output box" (not shown). The output box, described below, is in the possession of a sewer official or other person assessing the condition of the unit. The wiring from the rods to the connector 17 is preferably sufficiently long to allow the lid 68, to be removed and for the addition of expansion collars. The preferred thermocouple is available from Watlow Electric Manufacturing Company, 12001 Lackland Road, St. Louis, Missouri, USA 63146 as their Firerod Internal thermocouple, Style A.

In one example in the process, the voltages of the two thermocouples are measured at a first stage A and again at a later stage B, with power being supplied to the heaters between A and B. The changes in the voltages of the thermocouples are computed at stage C (either within the control box or remotely, as with the embodiment of FIGS. 1-9). If the voltage change exceeds a threshold (i.e. >x.xx mV), then an indication that the rate of rise was fast can be generated. A voltage change below the threshold indicates that the thermocouple is in water. If the voltage is over a higher threshold, similar logic can indicate that the thermocouple is in air. The threshold, of course, is determined for each separator design based upon geometry and the length of time the heaters stay on and the time between voltage readings. Applicants have used heaters of 50 and 200 watts and time intervals of ten seconds, but a wide range of other values would be suitable. Time intervals measured on the order of milliseconds can be used.

In both embodiments, if the temperature rise indicates that a thermocouple is in air, pumping or skimming is inappropriate. If both are in air, a repair may be needed.

Figure 13:
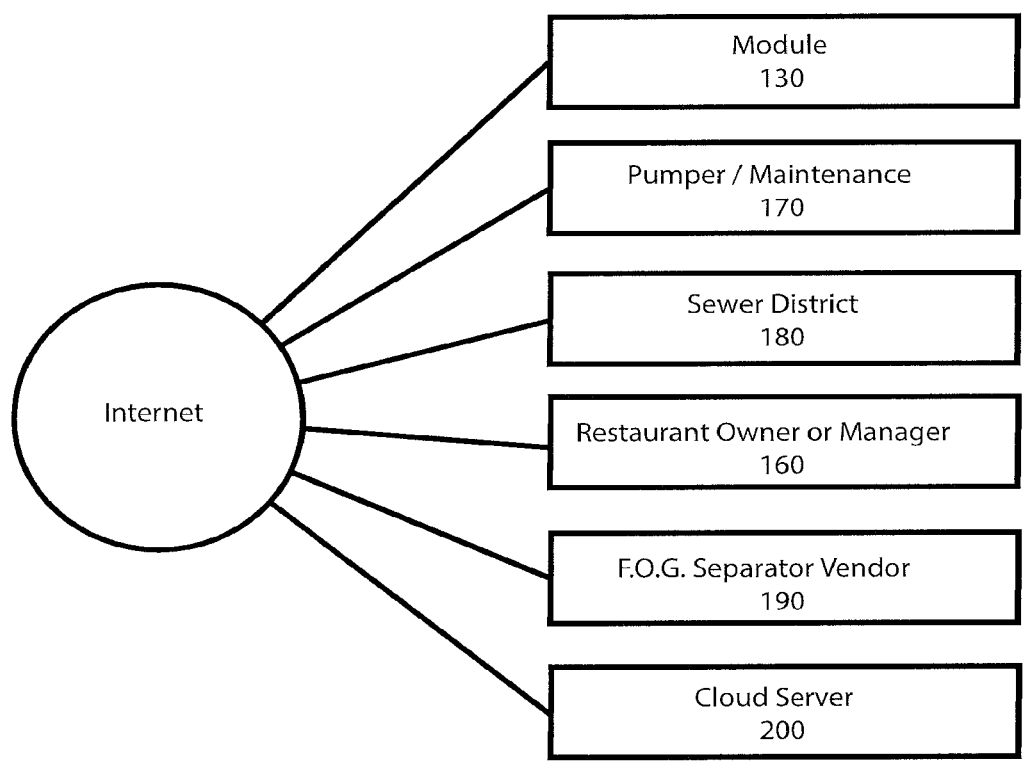
FIG. 13 is a block diagram of communications links from the F.O.G. separator to interested parties, including an optional cloud server.

As seen in FIG. 13, the communications module 130 has communications capabilities such as a cellphone or Wi-Fi connection and can relay messages from the sensors 112, 114 and switches. Sensors can sense temperature, solids levels, water levels, F.O.G. levels or other variables. The switches can be used to turn on a skimmer in a skimming type F.O.G. separator or signal lights or other devices. If desired, an inteimediate controller electrically situated between the module 130 and the sensors or switches can be included. A suitable module 130 may be available from Zytron Control Products, Inc., of Trenton, New Jersey. The module 130 can include a printed circuit board with a processor 140, transmitter 142, antenna 143, modem 144, and memory 146. The module 130 can operate with the Apple iOS, Google Android, or other suitable operating system. The memory may store an App to carry out the functions described herein. Information about the geographic location of the F.O.G. separator can be ascertained by the GPS module 132 for use by the controller 130.

In one embodiment the controller may permit cellphone or other communications operation to report a malfunction and/or need for a service call. In addition, the GPS receiver or the like can help a service technician locate where the F.O.G. separator is. Also, a central office can be informed of the selected mode or skimming frequency, so the central office can recommend or implement changes if it does not think a mode setting is appropriate for the specific establishment. The communications capability can report cumulative operating time to allow recommendations for replacement parts for preventative maintenance.

Referring to FIG. 13, the module 130 can be configured to send or relay information to restaurant owners or managers 160, or sewer system officials 180, grease pumpers or maintenance personnel 170, or to the F.O.G. separator system vendor 190, or more than one of them. The module 130 is given unique identifier, so as it sends or relays information, that identifier can be included in message protocols, enabling the recipient to know with which separator it is communicating. The module is preferably password protected.

The monitoring of the F.O.G. separator can include uploading data to a database for recordation in that database. The app in the module's memory is preferably programed to upload data in a consistent format to allow standardization in the database among all of the reporting separators. The database can be maintained by restaurant owners or managers, or sewer system officials, grease pumpers or maintenance personnel, or to the F.O.G. separator system vendor, or more than one of them.

The uploading of data can take place on a regular schedule, reporting whatever has or has not happened at a particular F.O.G. separator. Or, the uploading can be intermittent, only occurring when a reportable event occurs or to report a problem. A particularly useful message for grease traps requiring periodic pumping is a signal that such pumping is needed.

Data can also be downloaded to the module 130 in a particular separator, to provide updated software, or instructions for particular actions. For example, a vendor may download an override to reset control of the remote device.

In addition, the module 130 can be configured to allow for operation of the separator based upon logic and data stored "in the cloud," that is, on a remote server 200. The server includes the database and decision-making logic and downloads instructions to the module 130 in the separator. One such instruction to a skimming separator would be to tell the skimmer to be active. Locating the logic devices in the remote server allows the electronics at the separator to be reduced in complexity, essentially only the sensors needed to collect data and relays to open and close switches as instructed by the cloud server 200.

Also disclosed is a method of controlling removal of grease, oil and solid waste material from effluent water including: installing an oil, grease and solid waste removal assembly at a facility site; connecting an inlet pipe of the oil, grease and solid waste removal assembly to a source discharging effluent water with waste materials to be removed; connecting an outlet pipe of the oil, grease assembly to a sewage system; installing a communications module to allow the oil, grease and solid waste removal assembly at the facility site to communicate over cellular or WiFi signals to a remote station. The remote station can record data from the oil, grease and solid waste removal assembly at a facility site. In another embodiment the remote station can download instructions to the oil, grease and solid waste removal assembly at a facility site.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size, and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent. Certain modifications and improvements will occur to those skilled in the art upon reading the foregoing description. It should be understood that all such modifications and improvements have been omitted for the sake of conciseness and readability, but are properly within the scope of the following claims.

What is claimed is:

1. A separator system for separating fat, oil, and/or grease (F.O.G) from effluent comprising:
    a container for receiving and holding effluent water containing fat, oil, and/or grease (F.O.G) to be removed from the effluent water and permitting accumulation of fat, oil, and/or grease (F.O.G);
    a sensor associated with the container to sense accumulation of fat, oil, and/or grease (F.O.G) in the container and issue data about fat, oil, and/or grease (F.O.G.) that has accumulated in the container;
    a skimmer to skim accumulated fat, oil, and/or grease (F.O.G) from the effluent water held in the container;
    a communications module having a communications module application, processor, memory and transmitter in the system that is operatively associated with the sensor to communicate sensor data about fat, oil, and/or grease (F.O.G.) that has accumulated in the container to a remote station, and
    a second application located in the remote station and in communication with the communications module application and configured to assemble information from more than one separator system, update a database housing information from the more than one separator system, and provide a remote monitoring of the skimming, performance, and/or mechanics of each separator system.

2. The separator system of claim 1 wherein the communications module is in communication with a Global Positioning System (GPS) GPS module to allow determination of a geographic location of the separator system.

3. The separator system of claim 1 wherein the container includes a heating element electrically connected to the communications module to heat effluent in the container when heating commands are received from the remote station.

4. The separator system of claim 1 wherein
    the sensor includes the ability to sense and signal when a threshold amount of fat, oil, and/or grease (F.O.G) has accumulated in the container, and
    the communications module is operatively connected to the sensor and able to communicate with the remote station a status of the fat, oil, and/or grease (F.O.G) accumulated in the container.

5. The separator system of claim 4 wherein the status includes an indication of if the separator assembly should have accumulated, fat, oil, and/or grease (F.O.G) removed from it.

6. The separator system of claim 5 wherein accumulated fat, oil, and/or grease (F.O.G) removal occurs when a skimmer skims accumulated fat, oil, and/or grease (F.O.G) from the effluent water held in the container and discharges the skimmed fat, oil, and/or grease (F.O.G) through the opening from the container.

7. The separator system of claim 5 wherein the communications module includes a two-way communication capability.

8. The separator system of claim 7 wherein the two-way communication includes a first communication to a remote station.

9. The separator system of claim 8 wherein the two-way communication includes a second communication from a remote station to the communications module.

10. The separator system of claim 9 wherein the second communication is in response to an information sent to the remote station in the first communication.

11. The separator system of claim 10 wherein the second communication from the remote station causes a change in the accumulated fat, oil, and/or grease (F.O.G) removal at the separator assembly.

12. The separator system of claim 11 wherein the first communication includes uploading data to a database for recordation in that database in a standardized format a separator assembly status information.

13. The separator system of claim 12 wherein the database includes information from more than one separator assembly located at different locations.

14. The separator system of claim 13 wherein the second communication includes an option of an override to reset control of the separator assembly.

15. The separator system of claim 14 wherein the communications module is in communication with a remote server and the remote server includes a decision-making logic for the separator assembly, the remote server configured to download instructions to the communications module.

* * * * *